United States Patent
Su

[11] Patent Number: 6,163,267
[45] Date of Patent: Dec. 19, 2000

[54] DEVICE FOR MEASURING NOISE

[75] Inventor: David Su, Kaohsiung, Taiwan

[73] Assignee: Sunonwealth Electric Machine Industry Co., Ltd., China

[21] Appl. No.: 09/322,706

[22] Filed: May 28, 1999

[30] Foreign Application Priority Data

Nov. 21, 1998 [TW] Taiwan ................................. 87219361

[51] Int. Cl.⁷ .................................................. G08B 21/00
[52] U.S. Cl. ...................... 340/683; 367/135; 381/71.1; 381/317; 381/56; 381/94.1
[58] Field of Search .......................... 340/683; 367/135; 73/649; 381/317, 56, 92, 94.1

[56] References Cited

U.S. PATENT DOCUMENTS

| | | | |
|---|---|---|---|
| H417 | 1/1988 | Miles | 381/71.6 |
| 4,233,600 | 11/1980 | Rogers et al. | 340/683 |
| 4,456,795 | 6/1984 | Saito | 381/317 |
| 5,473,315 | 12/1995 | Holroyd | 340/683 |

*Primary Examiner*—Benjamin C. Lee
*Attorney, Agent, or Firm*—Chan Law Group; Marcia Devon

[57] ABSTRACT

The invention relates to a device for measuring noise comprising a sensor circuit having at least two sensors, an ambient noise eliminating circuit and a signal processing circuit. All the sensors are set to detect the ambient or background noise, however the source noise is positioned for detection by one of the sensors. The output of the sensor circuit is connected to the input of the ambient noise eliminating circuit where the ambient noise is eliminated from the noise signal leaving only a signal of the noise source. The signal processing circuit receives the signal of the measured noise, which is rectified and amplified, and then processed in the comparator circuit to determine whether the noise level is acceptable or not. The result is displayed through the display circuit comprising a plurality of LEDs.

2 Claims, 4 Drawing Sheets

DEVICE FOR MEASURING NOISE

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention pertains generally to noise measuring devices, and more particularly to a noise measuring device capable of filtering out background noise.

2. Description of the Background Art

Noise measuring devices typically use a sensor to receive the noise signals emanating from a source. The sensor, however, not only detects the noise from the source, but also any ambient background noise. Thus, measuring the value of the detected noise is inaccurate, as it includes the ambient background noise.

In order to alleviate this problem, it becomes necessary to place the source within an anechoic room for eliminating the interference caused by ambient background noise, and the equipment used for measuring the noise must also be placed into the anechoic room to obtain the noise measurement. Use of anechoic rooms to conduct noise measurements, however, generally incur significant costs, in addition to the inconvenience of having to move the noise source and/or the noise measuring equipment into the anechoic room.

Accordingly, there is a need for a noise measuring device that provides accurate noise measurements taken from virtually any location. The present invention satisfies those needs, as well as others, and generally overcomes the deficiencies presently known.

BRIEF SUMMARY OF THE INVENTION

The present invention pertains to a noise measuring device capable of accurately measuring and providing noise levels at virtually any location. The device measures both ambient of background noise and noise from a source intended for measurement and filters out background noise. The remaining noise signal is processed to determined whether the level is acceptable, and the result is displayed.

By way of example and not of limitation, the noise measuring device of the present invention comprises a sensor circuit having at least two sensors, an ambient noise eliminating circuit and signal processing circuit. All the sensors are set to detect the ambient noise, however the source noise is positioned for detection by one of the sensors. The output of the sensor circuit is connected to the input of the ambient noise eliminating circuit where the ambient noise is eliminated from the noise signal leaving only a signal of the noise source. The signal processing circuit receives the measured noise, which is rectified and amplified, and then processed in a comparator circuit to determine whether the noise level is acceptable. The result is displayed through the display circuit.

An object of the invention is to provide a noise measuring device that accurately measures the noise level of an intended noise source.

Another object of the invention is to provide a noise measuring device capable of providing accurate noise measurements at virtually any location, thereby alleviating the need for an anechoic room.

Still another object of the invention is to provide a noise measuring device capable of processing the noise measurement signal to determine whether the noise level from the intended noise source is acceptable.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Referring more specifically to the drawings, for illustrative purposes the present invention is embodied in the apparatus generally shown in FIG. 1 through FIG. 6. It will be appreciated that the apparatus may vary as to configuration and as to details of the parts without departing from the basic concepts as disclosed herein.

Figure 1:
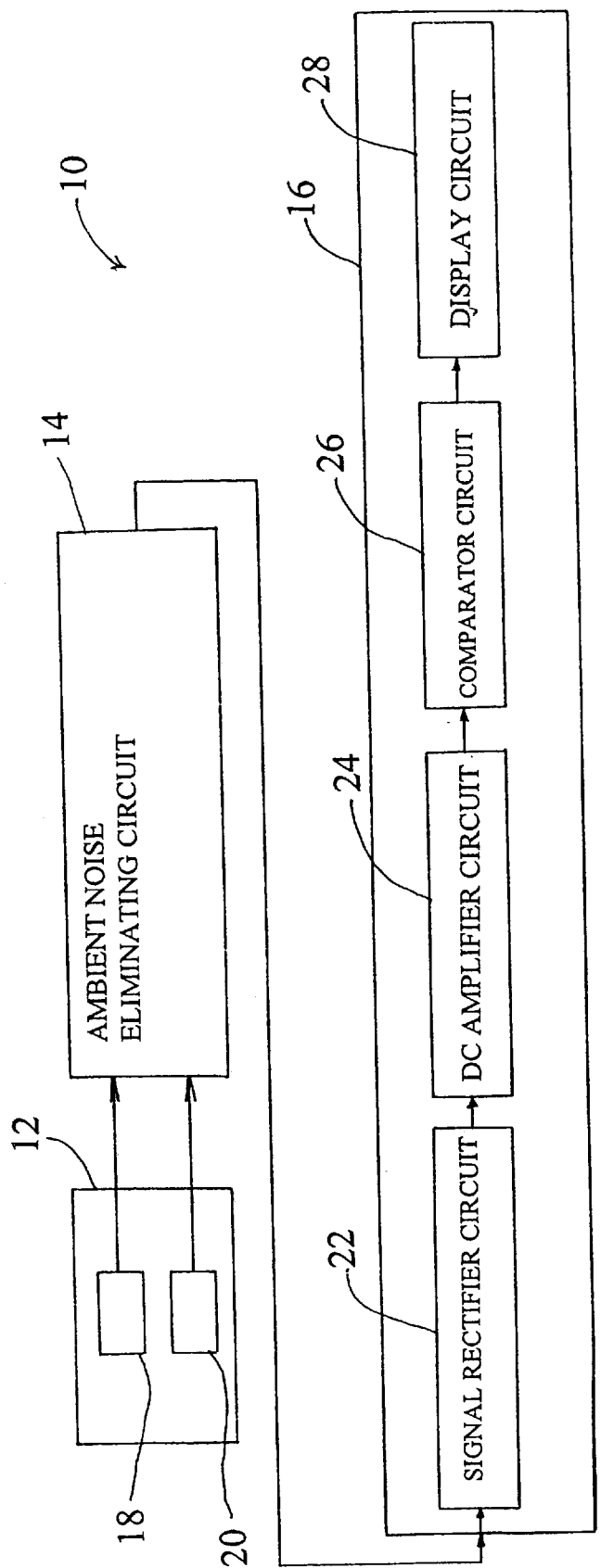
FIG. 1 is a functional block diagram of a noise measuring device in accordance with the present invention.
Figure 2:
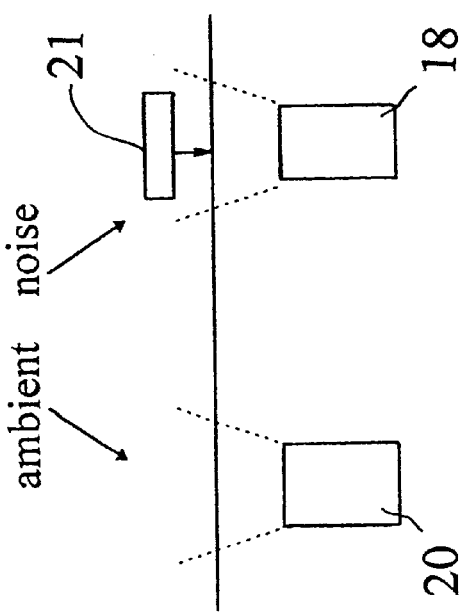
FIG. 2 is a functional block diagram illustrating a noise sensor circuit of the noise measuring device shown in FIG. 1.

Referring to FIG. 1 and FIG. 2, a functional block diagram of a noise measuring device 10 in accordance with the invention is generally shown. Device 10 generally comprises a sensor circuit 12, an ambient noise eliminating circuit 14 and a signal processing circuit 16. Sensor circuit 12 comprises a first noise sensor 18 and a second noise sensor 20, which are positioned to detect ambient noise. First and second noise sensors 18 and 20 are typically either professional capacitor-type microphones having high precision and sensitivity, or moving coil-type microphones having low impedance, high precision and sensitivity. It is also important for noise sensors 18 and 20 to possess high gain and low noise characteristics. The output of sensor circuit 12 is connected to an input for ambient noise eliminating circuit 14.

The object under test, such as a fan 21 or the like, is placed or positioned adjacent first noise sensor 18, as shown in FIG. 2. Because both noise sensors 18 and 20 can detect the ambient noise, the ambient noise can be eliminated by inverting the phase of the signal value of the ambient noise and fan from one of the noise sensors and adding the value of the ambient noise signal from the other sensor. Thus, ambient noise elimination can be performed by ambient noise eliminating circuit 14. In addition, a differential circuit can be used as the circuit for eliminating ambient noise. Because sensors 18 and 20 can detect the ambient noise, the ambient noise is directed to a common mode signal, and the common mode ambient noise can be eliminated by a differential circuit.

Signal processing circuit 16 generally comprises a signal rectifier circuit 22, a DC amplifier circuit 24, a comparator circuit 26 and a display circuit 28. Signal processing circuit 16 determines whether the noise from fan 21 is acceptable. The noise signal from fan 21, which does not include ambient noise, is rectified into a DC noise signal by signal rectifier circuit 22. DC amplifier circuit 24 then amplifies the DC noise signal, wherein the amplitude of the amplified DC noise signal is proportional to the actual fan noise. Comparator circuit 26 provides a reference signal voltage, which is compared to the amplified DC noise signal. If the voltage of the amplified DC noise signal is greater than the reference signal voltage, an output signal is initiated, thereby indicating that the fan noise is unacceptable. This output signal is shown by display circuit 28.

Figure 3:
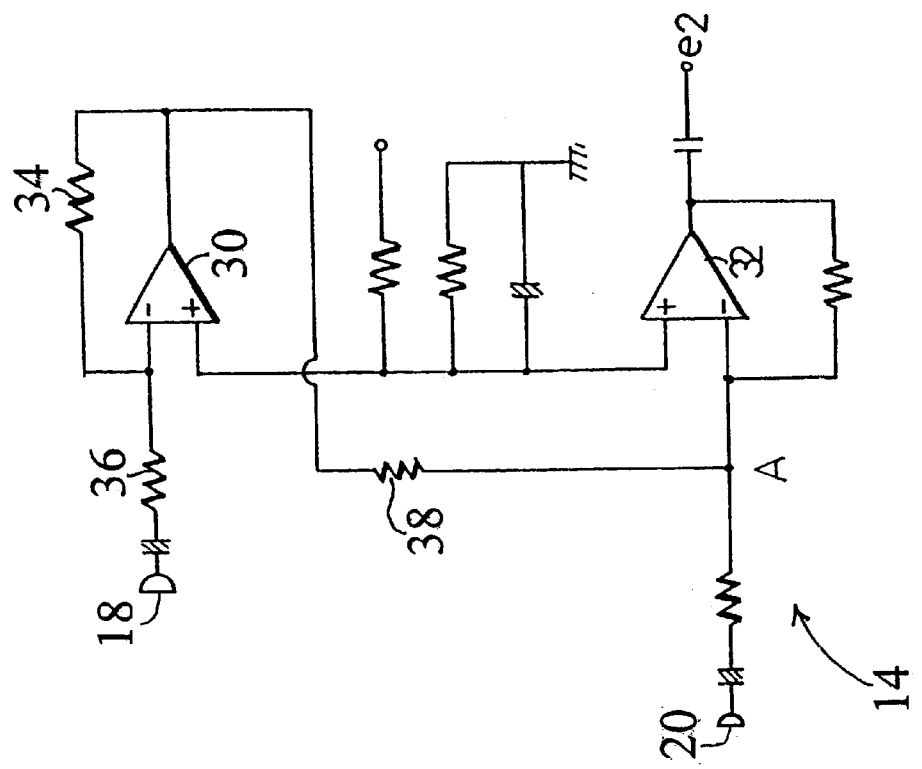
FIG. 3 is a schematic diagram of a noise sensor circuit of the noise measuring device shown in FIG. 1.

Referring also to FIG. 3, a circuit diagram depicting sensors 18 and 20 and ambient noise eliminating circuit 14 in accordance with the present invention is generally shown. Ambient noise eliminating circuit 14 comprises an inverting operational amplifier 30 and a operational amplifier 32. The following two scenarios illustrate how ambient noise eliminating circuit 14 eliminates ambient noise.

In the first scenario, both sensors 18 and 20 detect the same ambient noise. The ambient noise signal is amplified by both inverting operational amplifier 30 and operational amplifier 32. For example, the ambient noise signal (e0) is detected by sensors 18 and 20, and converted into a first and a second electrical signal voltage, respectively. The first electrical signal voltage then passes through inverting operational amplifier 30. Since the value of feedback resistor 34 is equal to the value of input resistor 36, the phase of the output signal voltage of inverting operational amplifier 30 is inverted (−e0). This inverted output signal voltage of inverting operational amplifier 30 is connected to the input of operational amplifier 32 at node A, after passing through a resistor 38. The sum of the output signal voltage (−e0) and the second electrical signal voltage (e0) from sensor 20 at node A becomes zero, given e0+(−e0)=0. Thus, the output of operational amplifier 32 is zero, indicating the elimination of ambient noise.

In a second scenario, fan 21 is mounted adjacent noise sensor 18 for detecting the noise from fan 21. The output signal voltage (e1) of the fan noise passes through inverting operational amplifier 30 and is output to node A, wherein the voltage at node A becomes (−e1). Sensor 20 does not detect the fan noise since both are separated, so the fan noise signal from sensor 20 is zero. Therefore, the signal voltage representing the noise from fan 21 becomes (−e1) at node A, given by (−e1)+0=(−e1). The signal voltage (−e1) through amplifying operational amplifier 32 becomes amplified to (e2), which does not include the ambient noise.

Figure 4:
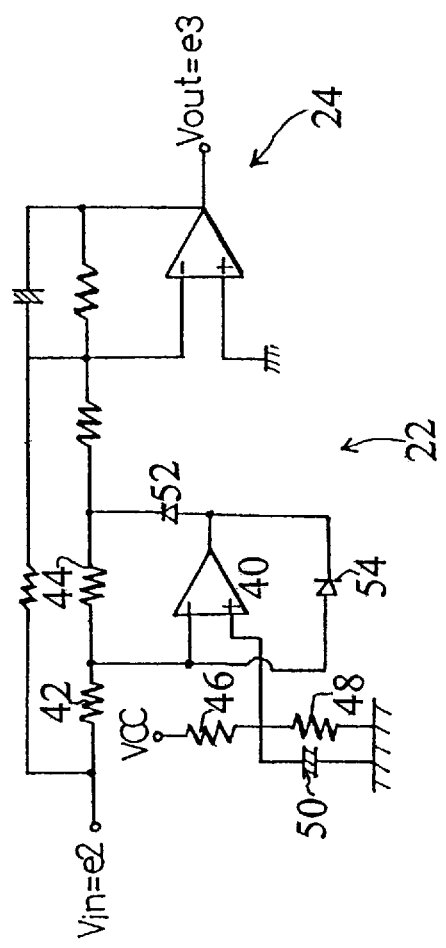
FIG. 4 is schematic diagram of a signal rectifier circuit and DC amplifier circuit of the noise measuring device shown in FIG. 1.

Referring also to FIG. 4, signal rectifier circuit 22 and DC amplifier circuit 24 in accordance with the present invention is generally shown. Full-wave rectification of signal voltage (e2) is achieved by the operational amplifier 40, as the input of operational amplifier 40 is connected to the output signal of operational amplifier 32, which is an AC signal. The resistors 42 and 44 are gain control resistors, while the resistors 46 and 48 function as the bias of operational amplifier 40 so that the AC signal from operational amplifier 32 can be full-wave rectified without any cut off. A capacitor 50 functions as a filter for the bias so as to provide a smooth bias for operational amplifier 40. The diodes 52 and 54 function as rectifier diodes. The rectified DC voltage is amplified and filtered through operational amplifier 40, resulting in a DC signal voltage output (e3).

Figure 5:
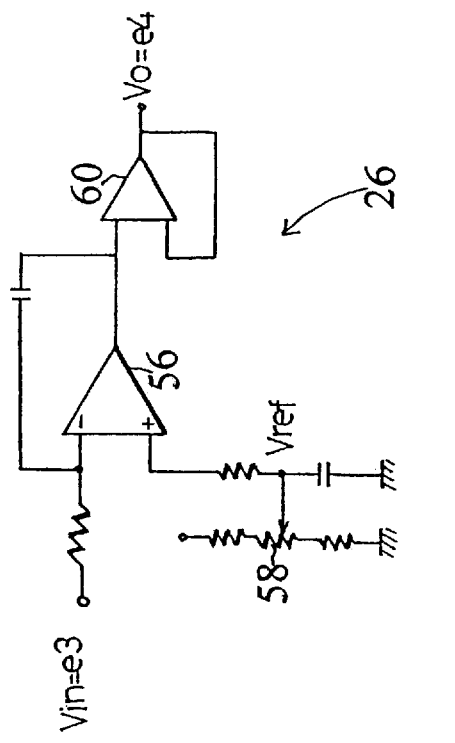
FIG. 5 is a schematic diagram of a comparator circuit of the noise measuring device shown in FIG. 1.

Referring to FIG. 5, comparator circuit 26 in accordance with the present invention is generally shown. The amplitude of the DC signal voltage output (e3) from operational amplifier 40 is proportional to the actual noise of fan 21. Therefore, the greater the noise level of fan 21, the greater the DC signal voltage output (e3). Similarly, the lower the noise level of fan 21, the lower the DC signal voltage output (e3). Comparator circuit 26 generally comprises an operational amplifier 56 and a means for an adjustable reference voltage, in order to determine whether the noise from fan 21 is acceptable. The means for an adjustable reference voltage is performed by an adjustable resistor 58 that allows for setting a DC reference voltage level ($V_{ref}$), below which noise from fan 21 is deemed acceptable. Operational amplifier 56 functions as a comparator. The DC signal voltage output (e3) is the input voltage received by comparator circuit 26. When the DC signal voltage output (e3) is greater than the DC reference voltage level ($V_{ref}$), operational amplifier 56 outputs a DC voltage, and the greater the value of the DC signal voltage output (e3), the greater, proportionally, the DC output voltage of operational amplifier 56. Another operational amplifier 60 functions as a buffer for the DC output voltage. When the DC signal voltage output (e3) is greater than the DC reference voltage, comparator circuit 26 outputs resulting voltage (e4), wherein the value of resulting voltage (e4) is proportional to the actual noise from fan 21. When the DC signal voltage output (e3) is less than the DC reference voltage, the comparator circuit 26 outputs the result (e4=0). Therefore, it can be determined whether the noise from fan 21 is acceptable based on the resulting voltage (e4).

Figure 6:
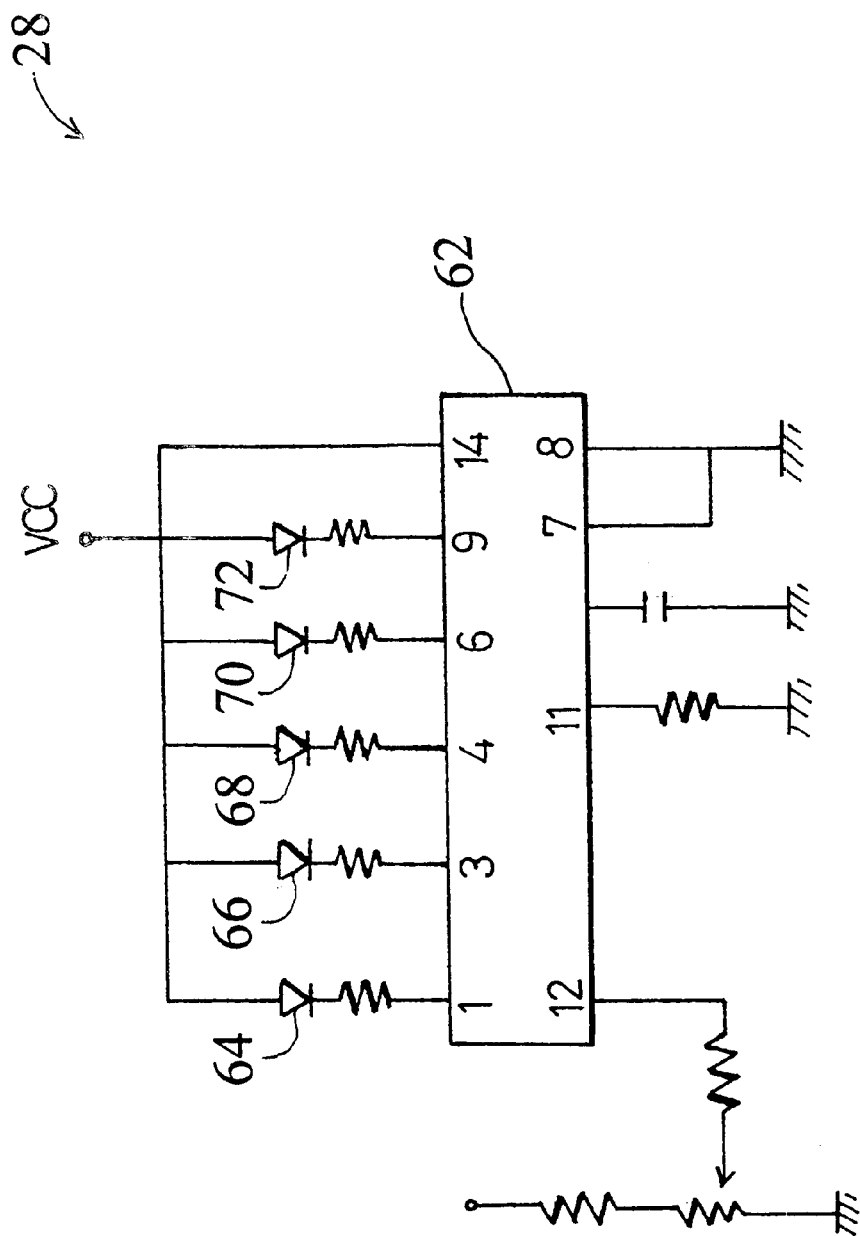
FIG. 6 is a schematic diagram of a display circuit of the noise measuring device shown in FIG. 1.

Referring also to FIG. 6, display circuit 28 in accordance with the present invention is generally shown. Display circuit 28 generally comprises an LED driver or microprocessor 62 and a plurality of LEDs 64, 66, 68, 70 and 72. Based on the amplitude of the resulting voltage (e4), LEDs 64, 66, 68, 70 or 72 will light up sequentially. When the resulting voltage (e4) is at a minimum, LED 64 will light, and when the resulting voltage (e4) is at a maximum, LED 72 will light. To better distinguish the amplitude of the resulting voltage (e4), LEDs 64, 66 and 68 preferably display a green colored illumination, which represents that the noise level of fan 21 is acceptable. LED 70 preferably displays a yellow colored illumination, which represents that the noise level of fan 21 is marginally acceptable. LED 72 displays a red colored illumination to represent that the noise of fan 21 is not within acceptable limits. Therefore, by simply observing the output of LEDs 64, 66, 68, 70 or 72 during a noise level test, one can readily ascertain whether the noise level of fan 21, or other object being tested, is acceptable.

Accordingly, it will be seen that this invention allows for measuring the noise level of a fan or other noise producing device at virtually any location without the need for an anechoic chamber, whereby ambient noise is eliminated, and the resulting noise level is visually displayed. Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. A noise measuring device, comprising:

a first noise sensor and a second noise sensor identical to said first sensor, said sensors having low impedance and placed adjacent each other, for detecting noise and converting the noise into a first electrical signal voltage and a second electrical signal voltage, respectively;

a first operational amplifier in electrical connection with said first and said second sensors, for inverting said first electrical signal voltage producing an inverted signal voltage and a circuit for adding said inverted first electrical signal voltage to said second electrical signal voltage, thereby obtaining a third electrical signal voltage for feeding into a second operational amplifier;

a signal processing circuit coupled to said second operational amplifier, said signal processing circuit including a signal rectifying circuit for rectifying said third electrical signal voltage and producing a rectified signal;

a DC signal converter for converting said rectified signal into a DC voltage;

an amplifier receiving said DC voltage and increasing the amplitude of said DC voltage producing an amplified signal;

a comparator circuit for comparing said amplified signal to a reference signal voltage and;

a display circuit in electrical connection with said comparator circuit for indicating when said DC voltage is greater than the reference signal value.

2. The device as claimed in claim 1 wherein said display circuit comprises a plurality of light-emitting diodes.

* * * * *